US011906924B2

(12) United States Patent
Sano et al.

(10) Patent No.: US 11,906,924 B2
(45) Date of Patent: Feb. 20, 2024

(54) IMAGE FORMING APPARATUS

(71) Applicant: BROTHER KOGYO KABUSHIKI KAISHA, Nagoya (JP)

(72) Inventors: Toshiyuki Sano, Iwakura (JP); Masaaki Furukawa, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/058,973

(22) Filed: Nov. 28, 2022

(65) Prior Publication Data

US 2023/0168620 A1 Jun. 1, 2023

(30) Foreign Application Priority Data

Nov. 30, 2021 (JP) ................................ 2021-194986

(51) Int. Cl.
*G03G 15/00* (2006.01)
*B65H 43/04* (2006.01)

(52) U.S. Cl.
CPC ......... *G03G 15/70* (2013.01); *G03G 15/5008* (2013.01); *G03G 15/6564* (2013.01); *G03G 2215/00721* (2013.01)

(58) Field of Classification Search
None
See application file for complete search history.

(56) References Cited

U.S. PATENT DOCUMENTS

| | | | | |
|---|---|---|---|---|
| 7,263,313 | B2 * | 8/2007 | Kim | G03G 21/1685 399/101 |
| 2012/0200028 | A1 * | 8/2012 | Shiraishi | G03G 15/70 271/110 |
| 2015/0277261 | A1 | 10/2015 | Suzuki | |
| 2016/0349664 | A1 | 12/2016 | Sawashima | |
| 2017/0242389 | A1 | 8/2017 | Asakawa | |
| 2021/0356900 | A1 | 11/2021 | Nakamura et al. | |

FOREIGN PATENT DOCUMENTS

| | | | |
|---|---|---|---|
| JP | 61-230165 | A | 10/1986 |
| JP | 6-135597 | A | 5/1994 |
| JP | 7-237783 | A | 9/1995 |
| JP | 8-220947 | A | 8/1996 |

(Continued)

*Primary Examiner* — Leslie J Evanisko
(74) *Attorney, Agent, or Firm* — Merchant & Gould P.C.

(57) ABSTRACT

A sensor is located upstream of a conveyance roller in a sheet conveyance direction. A switch switches driving and stopping of a photosensitive drum. A controller performs a first mode process as a warm-up process of driving the conveyance roller and a fuser. The first mode process includes: driving the photosensitive drum for a particular time; in response to detecting a sheet within the particular time by the sensor, controlling the switch to continue driving the photosensitive drum after the particular time elapses and to discharge the detected sheet to a sheet discharge tray; and in response to not detecting the sheet within the particular time by the sensor, controlling the switch to stop driving the photosensitive drum at a time point when the particular time elapses, and driving the conveyance roller and the fuser to complete the warm-up process in a state where the photosensitive drum is stopped.

8 Claims, 7 Drawing Sheets

(56) References Cited

FOREIGN PATENT DOCUMENTS

| | | | |
|---|---|---|---|
| JP | 8-286586 | A | 11/1996 |
| JP | 10-194522 | A | 7/1998 |
| JP | 2001-199610 | A | 7/2001 |
| JP | 2002-189322 | A | 7/2002 |
| JP | 2002-268503 | A | 9/2002 |
| JP | 2008-33169 | A | 2/2008 |
| JP | 2015-191210 | A | 11/2015 |
| JP | 2016-224418 | A | 12/2016 |
| JP | 2017-151165 | A | 8/2017 |
| JP | 2021-181797 | A | 11/2021 |
| JP | 2021-182044 | A | 11/2021 |

* cited by examiner

IMAGE FORMING APPARATUS

REFERENCE TO RELATED APPLICATIONS

This application claims priority from Japanese Patent Application No. 2021-194986 filed on Nov. 30, 2021. The entire content of the priority application is incorporated herein by reference.

BACKGROUND ART

In an image forming apparatus, there are cases where a residual sheet exists in the apparatus, such as when the power is turned off during printing or when a jammed sheet remains in the apparatus without being removed. If printing is performed while a residual sheet exists in the apparatus, a newly fed sheet collides with the residual sheet, for example, and printing may not be performed normally.

DESCRIPTION

In an image forming apparatus, when the power is turned on, when recovering from an error, when recovering from a sleep mode, and so on, a warm-up process is performed to drive a fuser, a photosensitive drum, a sheet conveyance roller, and so on. For example, it is conceivable that an image forming apparatus automatically discharges a residual sheet in parallel with the warm-up process.

However, a residual sheet is sometimes located near a sheet discharge section that discharges sheets in the apparatus, or is located away from the sheet discharge section. Thus, in order to perform automatic discharge, it is necessary to drive the photosensitive drum, the conveyance roller, and so on, for a long period of time. Further, when driving the photosensitive drum, it is necessary to apply a high voltage to the photosensitive drum and a development roller in order to suppress the toner on the development roller from adhering to the photosensitive drum.

In this way, by driving the photosensitive drum and so on for a long period of time when automatically discharging a sheet in a warm-up process, the life of the photosensitive drum and so on is shortened.

In view of the foregoing, an example of an object of this disclosure is to provide an image forming apparatus configured to suppress a decrease in life of a photosensitive drum and so on due to automatic sheet discharge during a warm-up process.

According to one aspect, this specification discloses an image forming apparatus. The image forming apparatus includes a conveyance roller, a photosensitive drum, a fuser, a sheet discharge tray, a sensor, a switch, and a controller. The conveyance roller is configured to convey a sheet. The photosensitive drum is configured to bear a toner image to be transferred to the sheet. The fuser is configured to fix the transferred toner image to the sheet. The sensor is located upstream of the conveyance roller in a sheet conveyance direction. The sensor is configured to detect the sheet. The switch is configured to switch driving and stopping of the photosensitive drum. The controller is configured to perform a first mode process as a warm-up process of driving the conveyance roller and the fuser. The first mode process includes: driving the photosensitive drum for a particular time; in response to detecting the sheet within the particular time by the sensor, controlling the switch to continue driving the photosensitive drum after the particular time elapses and to discharge the detected sheet to the sheet discharge tray; and in response to not detecting the sheet within the particular time by the sensor, controlling the switch to stop driving the photosensitive drum at a time point when the particular time elapses, and driving the conveyance roller and the fuser to complete the warm-up process in a state where the photosensitive drum is stopped. In the warm-up process, when the sensor does not detect the sheet within the particular time, driving the photosensitive drum is stopped, which reduce the driving time of the photosensitive drum and suppress a decrease in the life of the photosensitive drum. When the sensor detects the sheet within the particular time, driving the photosensitive drum is continued to perform automatic discharge of the sheet remaining in the apparatus. Thus, automatic discharge of the residual sheet is performed while reducing the driving time of the photosensitive drum.

Next, a mode for carrying out the present disclosure will be described with reference to the accompanying drawings.

[Image Forming Apparatus]

Figure 1:
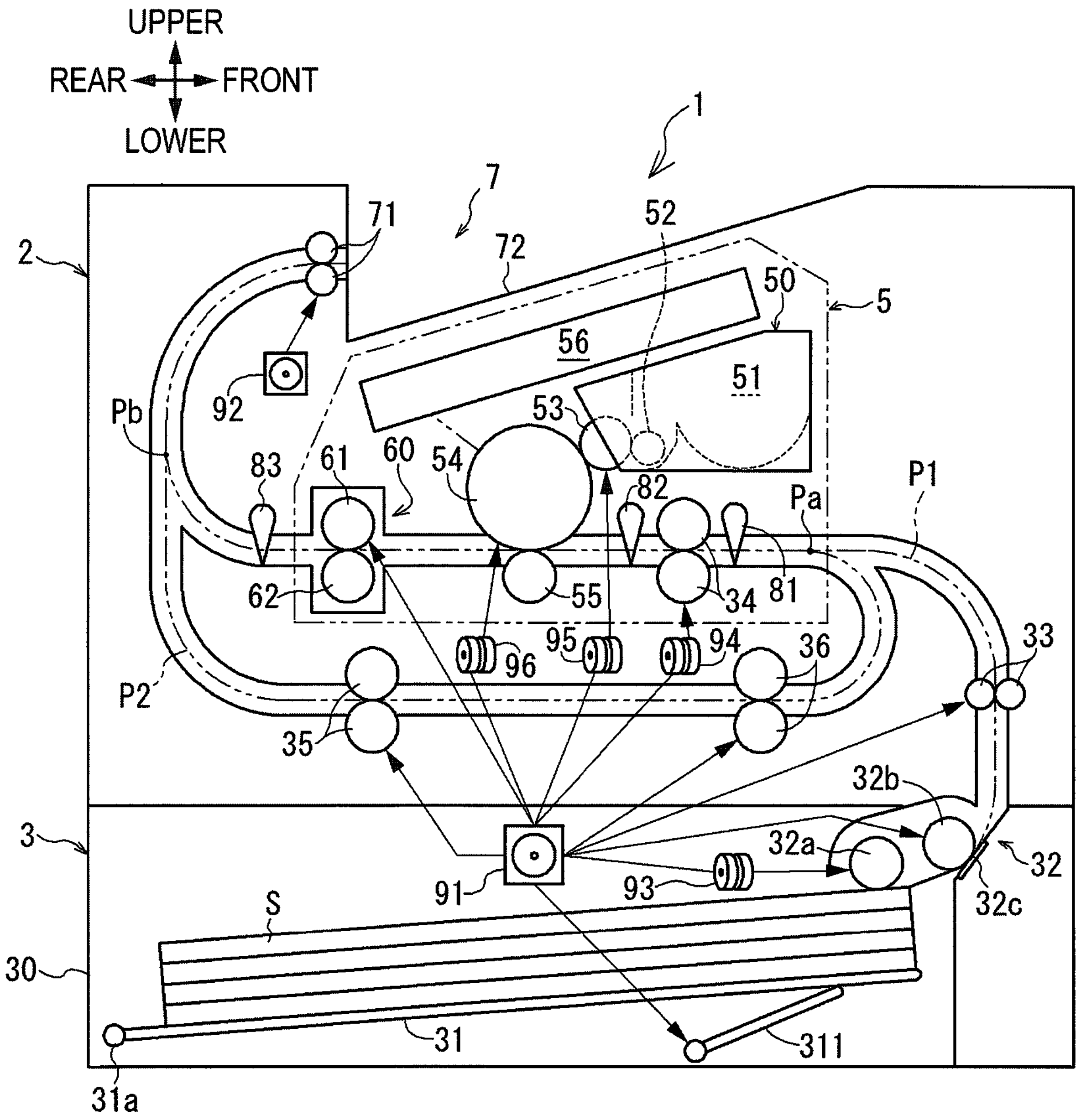
FIG. 1 is a central cross-sectional view showing an image forming apparatus.

An image forming apparatus 1 according to an embodiment of the present disclosure is shown in FIG. 1. For example, the image forming apparatus 1 is a laser printer that forms an image on a sheet S by an electrophotographic method.

In the following description, the right side in FIG. 1 is defined as the front side of the image forming apparatus 1, the left side in FIG. 1 is defined as the rear side of the image forming apparatus 1, the near side in a direction perpendicular to the drawing sheet of FIG. 1 is defined as the left side of the image forming apparatus 1, and the far side in the direction perpendicular to the drawing sheet of FIG. 1 is defined as the right side of the image forming apparatus 1. Further, the upper side and the lower side in FIG. 1 are defined as the upper side and the lower side of the image forming apparatus 1, respectively.

The image forming apparatus 1 includes a housing 2, a sheet feeder 3, a print engine (image forming section) 5, and a sheet discharge section 7.

The housing 2 accommodates the sheet feeder 3, the print engine 5 and the sheet discharge section 7. The sheet feeder 3 is arranged in the lower part of the housing 2 and conveys the sheet S supported by a sheet feed tray 30 to the print engine 5. The print engine 5 is arranged downstream of the sheet feeder 3 in a sheet conveyance direction, and forms an image on the sheet S conveyed from the sheet feeder 3. The sheet discharge section 7 is arranged downstream of the print engine 5 in the sheet conveyance direction, and discharges the sheet S on which an image has been formed by the print engine 5 to the outside of the image forming apparatus 1, or conveys the sheet S toward the print engine 5 again.

The sheet feeder 3 includes the sheet feed tray 30 that supports the sheets S, a sheet feed mechanism 32, a conveyance roller pair 33, and a registration roller pair 34. The image forming apparatus 1 has a conveyance path P1 for the sheet S extending from the sheet feeder 3 to the sheet discharge section 7 via the print engine 5.

The sheet feed tray 30 has a pressure plate 31 and a pressing plate 311. The pressure plate 31 is a plate-like member that supports the sheet S from below. The pressure plate 31 is pivotable about a pivot point 31*a* at the rear end, and is movable up and down between a lowered position and a raised position by pivoting about the pivot point 31*a*. The pressing plate 311 is located below the pressure plate 31, and moves the pressure plate 31 up and down between the lowered position and the raised position.

The sheet feed mechanism 32 includes a sheet feed roller 32*a*, a separation roller 32*b*, and a separation pad 32*c*. The sheet feed roller 32*a* is a roller for sending the sheet S supported by the sheet feed tray 30 toward the separation roller 32*b*. The separation roller 32*b* is arranged downstream of the sheet feed roller 32*a* in the sheet conveyance direction. The separation pad 32*c* is arranged to face the separation roller 32*b*, and is biased toward the separation roller 32*b*.

The sheets S sent out toward the separation roller 32*b* by the sheet feed roller 32*a* are separated one sheet at a time between the separation roller 32*b* and the separation pad 32*c*. The sheets S separated one sheet at a time are sent out to the conveyance path P1.

The sheet S sent out to the conveyance path P is conveyed toward the print engine 5 by the conveyance roller pair 33 and the registration roller pair 34. The registration roller pair 34 regulates the movement of the leading edge of the conveyed sheet S to temporarily stop the movement, and then conveys the sheet S toward the print engine 5 at a particular timing. The registration roller pair 34 is an example of a conveyance roller that conveys sheets.

A pre-registration sensor 81 is arranged upstream of the registration roller pair 34 in the sheet conveyance direction, and a post-registration sensor 82 is arranged downstream of the registration roller pair 34 in the sheet conveyance direction. The pre-registration sensor 81 is an example of a detection sensor that detects a sheet.

The pre-registration sensor 81 and the post-registration sensor 82 are sensors for detecting the sheet S. When the leading edge of the sheet S conveyed along the conveyance path P1 in the conveyance direction reaches the position of the pre-registration sensor 81, the pre-registration sensor 81 is turned on to detect the sheet S. When the trailing edge of the sheet S conveyed along the conveyance path P1 in the conveyance direction passes the position of the pre-registration sensor 81, the pre-registration sensor 81 is turned off and the sheet S is no longer detected.

When the leading edge of the sheet S conveyed along the conveyance path P1 in the conveyance direction reaches the position of the post-registration sensor 82, the post-registration sensor 82 is turned on to detect the sheet S. When the trailing edge of the sheet S conveyed along the conveyance path P1 in the conveyance direction passes the position of the post-registration sensor 82, the post-registration sensor 82 is turned off and the sheet S is no longer detected.

At the time of printing, the registration roller pair 34 starts its rotation after an elapse of a particular time after the leading edge of the sheet S conveyed along the conveyance path P in the conveyance direction reaches the position of the pre-registration sensor 81 and the pre-registration sensor 81 is turned on. The registration roller pair 34 stops its rotation after an elapse of a particular time after the trailing edge of the sheet S reaches the position of the post-registration sensor 82 and the post-registration sensor 82 is turned off.

The print engine 5 includes a process cartridge 50 that transfers an image to the surface of the sheet S conveyed from the sheet feeder 3, an exposure unit 56 that exposes the surface of a photosensitive drum 54 in the process cartridge 50, and a fuser (fixing device) 60 for fixing the image transferred to the sheet S by the process cartridge 50.

The process cartridge 50 is arranged above the sheet feeder 3 in the housing 2, and includes a developer storage chamber 51, a supply roller 52, a development roller 53, the photosensitive drum 54, a transfer roller 55, and so on.

The exposure unit 56 includes a laser diode, a polygon mirror, a lens, a reflecting mirror, and so on, and irradiates the photosensitive drum 54 with laser light based on image data input to the image forming apparatus 1, thereby exposing the surface of the photosensitive drum 54.

The developer storage chamber 51 stores toner as a developer. The toner stored in the developer storage chamber 51 is sent to the supply roller 52 while being stirred by an agitating member (not shown). The supply roller 52 further supplies the toner sent from the developer storage chamber 51 to the development roller 53.

The development roller 53 is arranged in close contact with the supply roller 52, and bears toner supplied from the supply roller 52 and positively charged by a sliding contact member (not shown). A developing bias is applied to the development roller 53 by a bias application means (not shown).

The photosensitive drum 54 is arranged adjacent to the development roller 53. The surface of the photosensitive drum 54 is uniformly charged by a charger (not shown) and then exposed by the exposure unit 56. The exposed portion of the photosensitive drum 54 has a lower potential than other portions, and an electrostatic latent image based on the image data is formed on the photosensitive drum 54. Then, positively charged toner is supplied from the development roller 53 to the surface of the photosensitive drum 54 on which the electrostatic latent image is formed, whereby the electrostatic latent image is visualized to form a toner image.

The transfer roller 55 is arranged to face the photosensitive drum 54, and is applied with a transfer bias by a bias application means (not shown). In a state in which a transfer bias is applied to the surface of the transfer roller 55, the sheet S is conveyed while being nipped between the photosensitive drum 54 on which the toner image is formed and the transfer roller 55, whereby the toner image formed on the surface of the photosensitive drum 54 is transferred to the surface of the sheet S. That is, a toner image to be transferred to the sheet S is formed on the photosensitive drum 54.

The sheet S to which the toner image has been transferred is conveyed to the fuser 60. The fuser 60 includes a heating roller 61 and a pressure roller 62 that is in pressure contact with the heating roller 61, and the toner image is thermally fixed on the sheet S conveyed to the fuser 60 while the sheet passes between the heating roller 61 and the pressure roller 62. That is, the fuser 60 fixes the transferred toner image on the sheet.

The sheet discharge section 7 is located downstream of the fuser 60 in the sheet conveyance direction, and includes a sheet discharge roller pair 71 and a sheet discharge tray 72.

The sheet discharge roller pair 71 is configured to discharge the sheet S conveyed from the fuser 60 along the conveyance path P1 toward the outside of the housing 2. The sheet discharge tray 72 is formed on the upper surface of the housing 2 and supports the sheet S discharged to the outside of the housing 2 by the sheet discharge roller pair 71. A sheet discharge sensor 83 is arranged between the fuser 60 and the sheet discharge roller pair 71 in the sheet conveyance direction. The sheet discharge sensor 83 is a sensor for detecting the sheet S.

The sheet discharge roller pair 71 is configured to rotate in a sheet discharge direction, which is the rotation direction when conveying the sheet S toward the sheet discharge tray 72, and in a reconveyance direction, which is the rotation direction opposite to the sheet discharge direction. The image forming apparatus 1 has a reconveyance path P2 that guides the sheet S that has been conveyed along the conveyance path P1 and has passed through the fuser 60 to the conveyance path P1 upstream of the registration roller pair 34 in the sheet conveyance direction.

The reconveyance path P2 branches off from the conveyance path P1 at a branch point Pb located between the fuser 60 and the sheet discharge roller pair 71, then extends forward between the print engine 5 and the sheet feed tray 30, and merges with the conveyance path P1 at a merge point Pa located between the conveyance roller pair 33 and the registration roller pair 34.

The sheet S conveyed from the fuser 60 to the sheet discharge section 7 is conveyable again to the print engine 5 through the reconveyance path P2 by the sheet discharge roller pair 71 rotating in the reconveyance direction. The sheet S conveyed to the reconveyance path P2 by the sheet discharge roller pair 71 is conveyed toward the print engine 5 by a first reconveyance roller pair 35 and a second reconveyance roller pair 36 provided on the reconveyance path P2.

The image forming apparatus 1 performs double-sided printing such that the sheet S on which an image has been formed on one side by the print engine 5 is conveyed again to the print engine 5 through the reconveyance path P2 and an image is formed on the other side of the sheet S.

In the image forming apparatus 1, the conveyance path P1 passes through the registration roller pair 34, the photosensitive drum 54, and the fuser 60 from the upstream side of the registration roller pair 34 in the sheet conveyance direction. The reconveyance path P2 guides the sheet S that has passed through the fuser 60 to the conveyance path P1 upstream of the registration roller pair 34 in the sheet conveyance direction. The merge point Pa between the conveyance path P1 and the reconveyance path P2 is located upstream of the registration roller pair 34 in the sheet conveyance direction, and the pre-registration sensor 81 is located downstream of the merge point Pa in the sheet conveyance direction.

Figure 2:
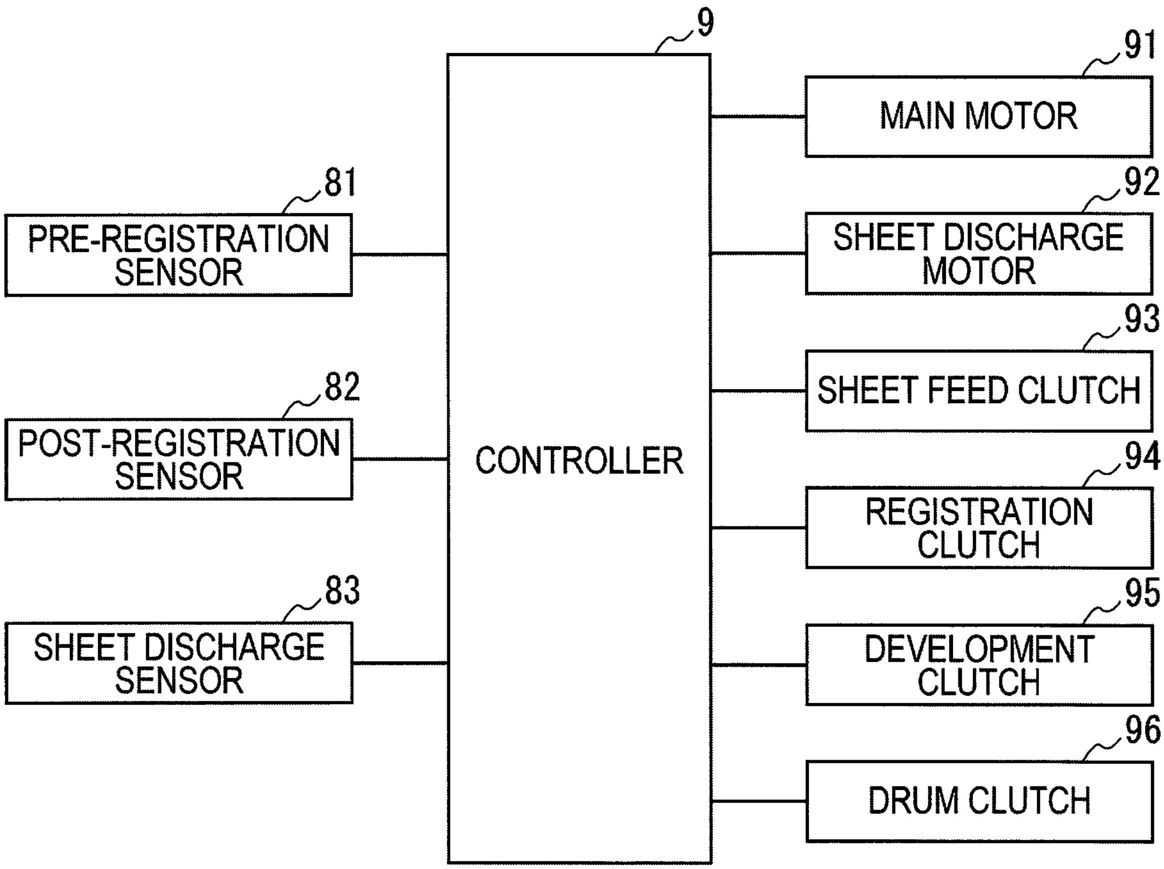
FIG. 2 is a block diagram relating to sheet conveyance in the image forming apparatus.

As shown in FIG. 2, the image forming apparatus 1 includes a controller 9, a main motor 91, a sheet discharge motor 92, a sheet feed clutch 93, a registration clutch 94, a development clutch 95, and a drum clutch 96. The main motor 91, the sheet discharge motor 92, the sheet feed clutch 93, the registration clutch 94, the development clutch 95, and the drum clutch 96 are connected to the controller 9 and the operations thereof are controlled by the controller 9.

The main motor 91 is connected to the sheet feed roller 32*a*, the separation roller 32*b*, the conveyance roller pair 33, the registration roller pair 34, the first reconveyance roller pair 35, the second reconveyance roller pair 36, the development roller 53, the photosensitive drum 54, and the heating roller 61 of the fuser 60. The sheet feed roller 32*a*, the separation roller 32*b*, the conveyance roller pair 33, the registration roller pair 34, the first reconveyance roller pair 35, the second reconveyance roller pair 36, the development roller 53, the photosensitive drum 54, and the heating roller 61 are driven by the main motor 91. The main motor 91 is an example of a common drive source that drives a conveyance roller, a photosensitive drum, and a fuser.

Thus, in the image forming apparatus 1, the registration roller pair 34, the photosensitive drum 54, the heating roller 61 of the fuser 60 and so on are driven by the common main motor 91. As a result, for example, it is possible to reduce the cost and save space as compared to the case of providing a drive source for driving the photosensitive drum 54 from a drive source for driving the fuser 60 and so on, or the case of using a type of clutch that is turned on/off by a motor as a switch for switching driving of the photosensitive drum 54.

The sheet feed roller 32*a* is connected to the main motor 91 via the sheet feed clutch 93. The sheet feed clutch 93 is configured of an electromagnetic clutch, for example. The sheet feed clutch 93 is switchable between a transmission state in which the driving force from the main motor 91 is transmitted to the sheet feed roller 32*a* and a cut-off state in which the driving force from the main motor 91 is not transmitted to the sheet feed roller 32*a*.

The registration roller pair 34 is connected to the main motor 91 via the registration clutch 94. The registration clutch 94 is configured of an electromagnetic clutch, for example. The registration clutch 94 is switchable between a transmission state in which the driving force from the main motor 91 is transmitted to the registration roller pair 34 and a cut-off state in which the driving force from the main motor 91 is not transmitted to the registration roller pair 34.

The development roller 53 is connected to the main motor 91 via the development clutch 95. The development clutch 95 is configured of an electromagnetic clutch, for example. The development clutch 95 is switchable between a transmission state in which the driving force from the main motor 91 is transmitted to the development roller 53 and a cut-off state in which the driving force from the main motor 91 is not transmitted to the development roller 53.

The photosensitive drum 54 is connected to the main motor 91 via the drum clutch 96. The drum clutch 96 is configured of an electromagnetic clutch, for example. The drum clutch 96 is switchable between a transmission state in which the driving force from the main motor 91 is transmitted to the photosensitive drum 54 and a cut-off state in which the driving force from the main motor 91 is not transmitted to the photosensitive drum 54. The drum clutch 96 is an example of a switch that switches driving and stopping the photosensitive drum.

The main motor 91 is connected to the pressing plate 311, and the pressing plate 311 is driven by the main motor 91. When the pressing plate 311 is driven by the main motor 91, the pressure plate 31 is raised and lowered.

The sheet discharge motor 92 is connected to the sheet discharge roller pair 71, and the sheet discharge roller pair 71 is driven by the sheet discharge motor 92. By being driven by the sheet discharge motor 92, the sheet discharge roller pair 71 rotates in the sheet discharge direction or the reconveyance direction.

The pre-registration sensor 81, the post-registration sensor 82, and the sheet discharge sensor 83 are connected to the controller 9. The controller 9 receives detection information from the pre-registration sensor 81, detection information from the post-registration sensor 82, and detection information from the sheet discharge sensor 83.

[Warm-Up Process]

In the image forming apparatus 1, the controller 9 executes a warm-up process when the power is turned on, when returning from an error such as a jam of the sheet S, or when returning from a sleep mode. The warm-up process is a process of driving the process cartridge 50 including the registration roller pair 34, the development roller 53 and the photosensitive drum 54, the fuser 60, the main motor 91, and so on, heating the heating roller 61 in the fuser 60, performing cleaning of the photosensitive drum 54, checking the state of the process cartridge 50, and so on.

In the warm-up process, if there is a residual sheet remaining in the housing 2 because the power is turned off during printing or the jammed sheet S remains in the housing 2, an automatic sheet discharge process of automatically discharging the residual sheet is executed.

Figure 3:
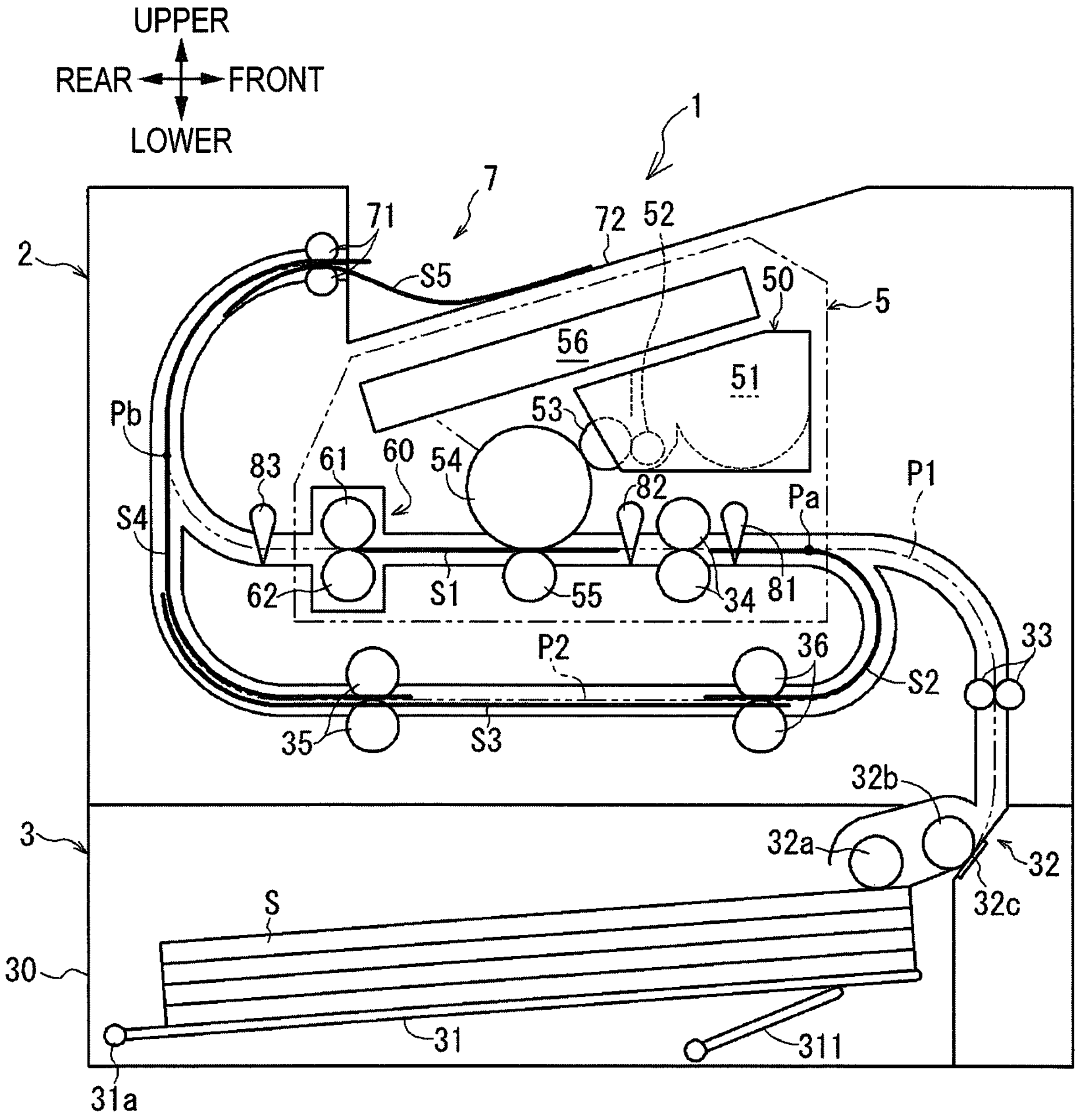
FIG. 3 is a central cross-sectional view showing a residual position of a residual sheet in a housing.

As shown in FIG. 3, residual position patterns of residual sheets in the housing 2 include a first residual position S1, a second residual position S2, a third residual position S3, a fourth residual position S4, and a fifth residual position S5. The first residual position S1 is a residual position where the sheet S is located between the post-registration sensor 82 and the sheet discharge sensor 83. The second residual position S2 is a residual position where the leading edge of the conveyed sheet S is detected by the pre-registration sensor 81.

The third residual position S3 is a residual position where the leading edge of the sheet S conveyed along the reconveyance path P2 is located upstream of the pre-registration sensor 81 in the sheet conveyance direction, and the trailing edge of the sheet S conveyed along the reconveyance path P2 is located downstream of the sheet discharge roller pair 71 in the sheet conveyance direction. The fourth residual position S4 is a residual position where the trailing edge of the sheet S conveyed along the reconveyance path P2 is nipped by the sheet discharge roller pair 71 while the sheet discharge roller pair 71 is rotating in the reconveyance direction. The fifth residual position S5 is a residual position where the leading edge of the sheet S is nipped by the sheet discharge roller pair 71 while the sheet discharge roller pair 71 is rotating in the reconveyance direction.

As the warm-up process including the automatic sheet discharge process, the controller 9 selectively executes a first mode process capable of suppressing the driving time of the photosensitive drum 54 and so on to suppress a decrease in the life of the photosensitive drum 54 and so on, and a second mode process capable of increasing the residual position patterns in which residual sheets are automatically discharged.

In the controller 9, it is possible to selectively set one of a first mode for executing the first mode process and a second mode for executing the second mode process. The setting of the first mode or the second mode is performed by the user, for example, by inputting to an input interface and so on of the image forming apparatus 1.

The warm-up process when executing the first mode process will be described.

Figure 4A:
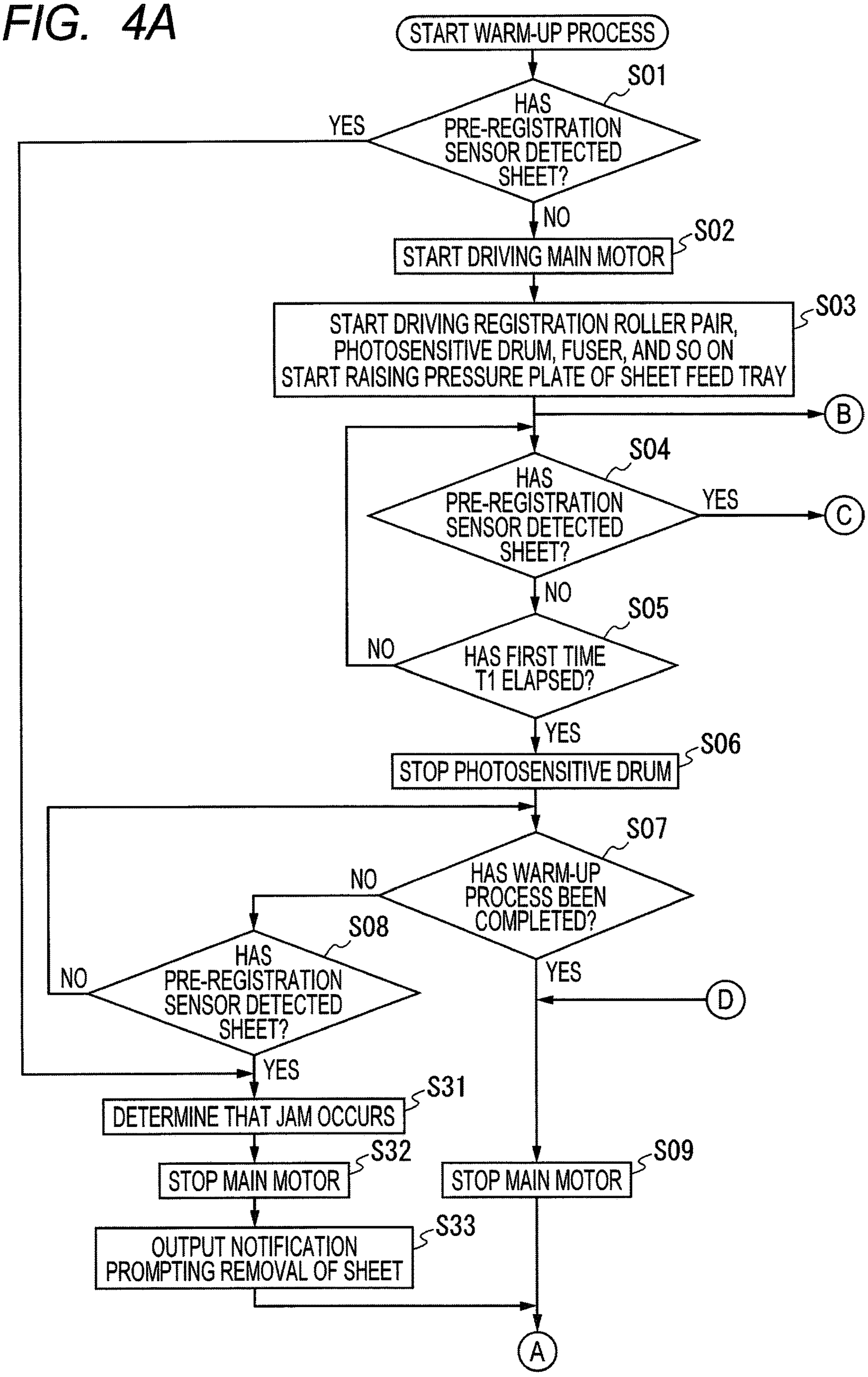
FIGS. 4A and 4B show a flowchart of a warm-up process when executing a first mode process.
Figure 4B:
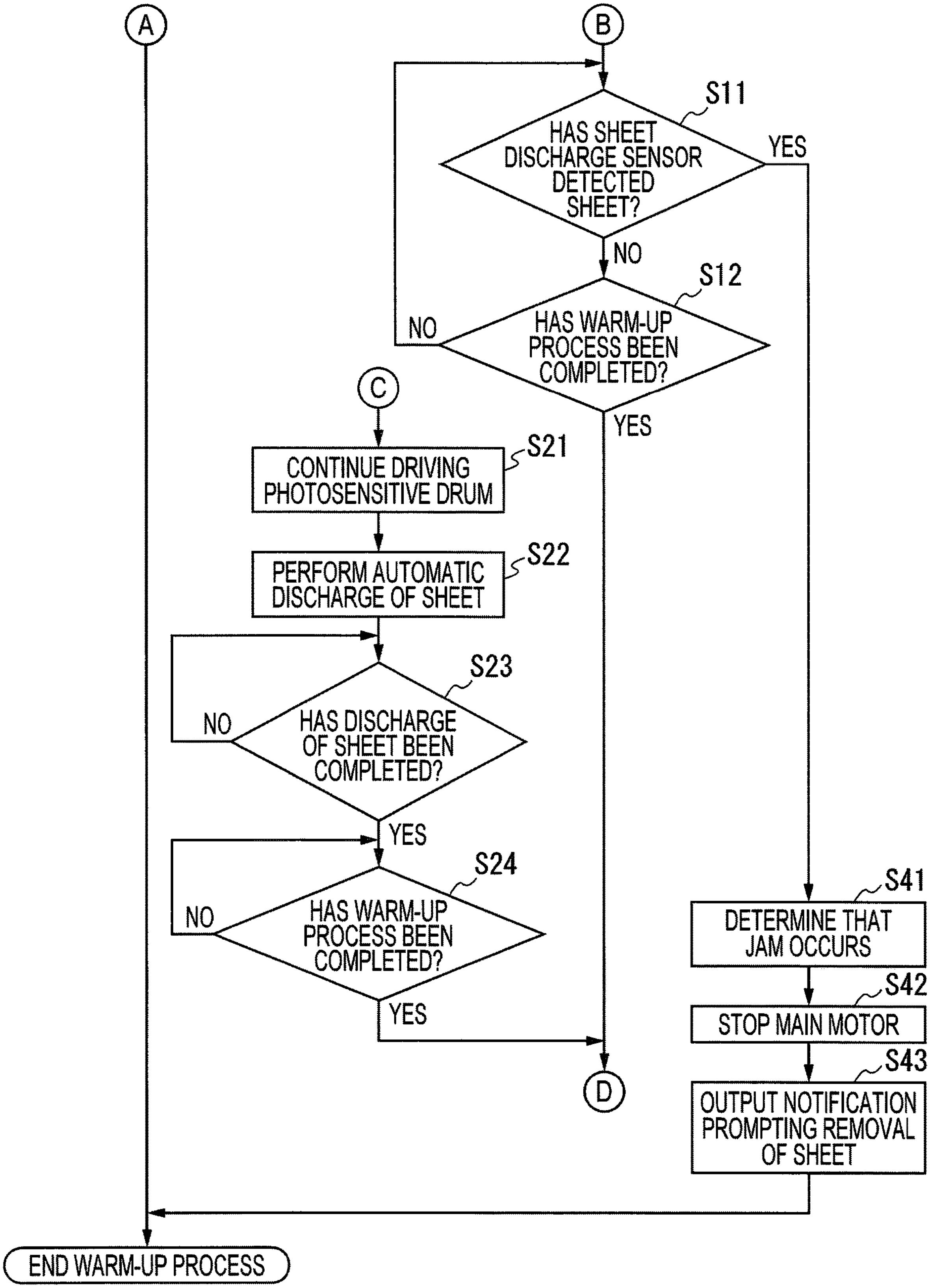

As shown in FIGS. 4A and 4B, when the warm-up process is started, the controller 9 determines whether the pre-registration sensor 81 has detected the sheet S (step S01). Hereinafter, step will be abbreviated as "S". In response to determining in S01 that the pre-registration sensor 81 has not detected the sheet S (S01: NO), the controller 9 starts driving the main motor 91 (S02). When the main motor 91 starts to be driven, the controller 9 switches the sheet feed clutch 93, the registration clutch 94, the development clutch 95, and the drum clutch 96 to the transmission state.

When the driving of the main motor 91 is started, the main motor 91 drives the registration roller pair 34, the photosensitive drum 54, the development roller 53, the fuser 60, and so on (S03). A high voltage is applied to the photosensitive drum 54 and the development roller 53. The pressing plate 311 of the sheet feed tray 30 is driven by the main motor 91, and the pressure plate 31 starts to rise (S03).

After the main motor 91 starts to be driven and the registration roller pair 34, the photosensitive drum 54, the fuser 60, and so on are driven in S03, the controller 9 executes a processing flow of S04 and thereafter and a processing flow of S11 and thereafter in parallel. The controller 9 determines whether the pre-registration sensor 81 has detected the sheet S (S04). In response to determining in S04 that the pre-registration sensor 81 has not detected the sheet S (S04: NO), the controller 9 determines whether a first time T1 has elapsed after the main motor 91 started to be driven (S05). The first time T1 is an example of a particular time during which the photosensitive drum is driven in the warm-up process.

In response to determining in S05 that the first time T1 has not elapsed (S05: NO), the controller 9 executes S04 again. If the pre-registration sensor 81 has not detected the sheet S in S04, the controller 9 repeatedly executes S04 until the first time T1 elapses.

If the first time T1 has elapsed without the pre-registration sensor 81 detecting the sheet S in S04 (S05: YES), the controller 9 switches the development clutch 95 and the drum clutch 96 to the cut-off state to stop the development roller 53 and the photosensitive drum 54 (S06). In this case, the registration roller pair 34 and the fuser 60 continue to be driven while the development roller 53 and the photosensitive drum 54 remain stopped.

In the warm-up process, when the photosensitive drum 54 and the development roller 53 are to be driven, it is necessary to drive the photosensitive drum 54 and the development roller 53 with a high voltage by a bias application means applied for the time required for the photosensitive drum 54 to make at least three rotations in order to prevent the toner from the development roller 53 from adhering to the photosensitive drum 54.

Thus, in the warm-up process, the first time T1 is set to a time longer than or equal to the time required for the photosensitive drum 54 to make three rotations. Here, the first time T1 is time from when the main motor 91 starts to be driven until when the photosensitive drum 54 and the development roller 53 are stopped. In this way, by setting the first time T1 to a time longer than or equal to the time required for the photosensitive drum 54 to make three rotations, the driving time of the photosensitive drum 54 and the development roller 53 is suppressed while suppressing the state in which the toner from adhering to the photosensitive drum 54 during the warm-up process.

After stopping the development roller 53 and the photosensitive drum 54 in S06, the controller 9 determines whether the warm-up process is completed (S07). In response to determining in S07 that the warm-up process has not been completed (S07: NO), the controller 9 determines whether the pre-registration sensor 81 has detected the sheet S (S08). In response to determining in S08 that the pre-registration sensor 81 has not detected the sheet S (S08: NO), the controller 9 executes S07 again.

The controller 9 determines in S07 whether the warm-up process is completed, for example, by determining whether a second time T2 has elapsed after the main motor 91 started to be driven. The second time T2 is set, for example, to a time sufficient to complete processes such as heating of the heating roller 61 in the fuser 60, cleaning of the photosensitive drum 54, and checking of the state of the process cartridge 50 in the warm-up process.

In response to determining in S07 that the warm-up process is completed (S07: YES), the controller 9 stops driving the main motor 91 (S09), and ends the warm-up process. When the warm-up process is completed, that is, when the second time T2 has elapsed after the main motor 91 started to be driven, the raising of the pressure plate 31 of the sheet feed tray 30 is completed.

After the registration roller pair 34, the photosensitive drum 54, the fuser 60, and so on are driven in S03, the controller 9 determines whether the sheet discharge sensor 83 has detected the sheet S (S11). In response to determining in S11 that the sheet discharge sensor 83 has not detected the sheet S (S11: NO), the controller 9 determines whether the warm-up process is completed (S12).

In response to determining in S12 that the warm-up process has not been completed (S12: NO), the controller 9 executes S11 again. In response to determining in S12 that the warm-up process is completed (S12: YES), the controller 9 stops driving the main motor 91 (S09), and ends the warm-up process.

As described above, if the pre-registration sensor 81 does not detect the sheet S before the first time T elapses after the start of driving of the main motor 91, if the pre-registration sensor 81 does not detect the sheet S before the warm-up process is completed after an elapse of the first time T1, and if the sheet discharge sensor 83 does not detect the sheet S before the warm-up process is completed after the start of driving of the main motor 91, it means that there was no residual sheet at the first residual position S1, the second residual position S2, the third residual position S3, or the fourth residual position S4.

Figure 5:
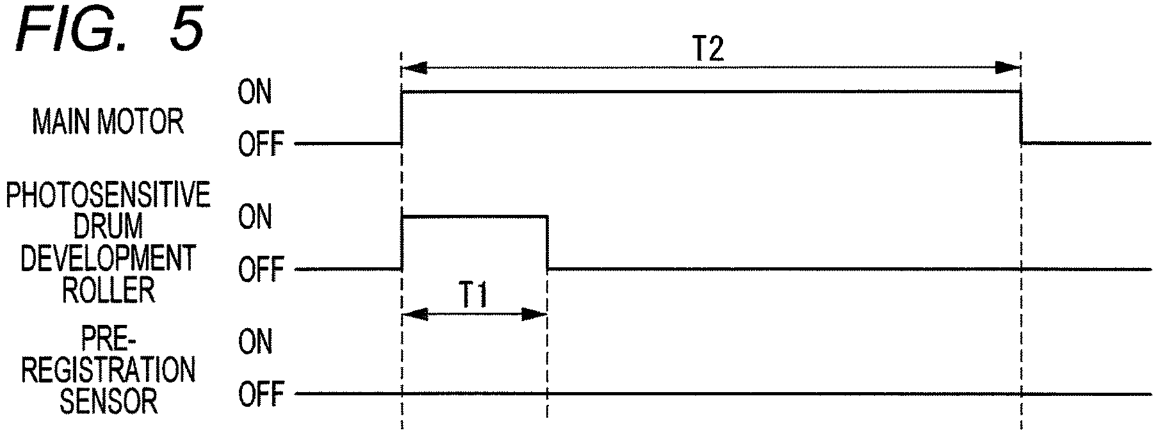
FIG. 5 is a timing chart showing a case where a pre-registration sensor does not detect a sheet before a first time elapses after a main motor starts driving in the warm-up process.

In such a case, as shown in FIG. 5, the drum clutch 96 and the development clutch 95 are switched to the cut-off state at the time point when the first time T1 has elapsed from the start of driving of the main motor 91 to stop the driving of the photosensitive drum 54 and the development roller 53. After that, when the second time T2 has elapsed, the controller 9 determines that the warm-up process is completed, stops driving of the main motor 91, and ends the warm-up process.

In the warm-up process, when the pre-registration sensor 81 has not detected the sheet S at the time point when the first time T1 has elapsed from the start of driving of the main motor 91, the driving of the photosensitive drum 54 and the development roller 53 is stopped. Thus, the driving time of the photosensitive drum 54 and the development roller 53 is reduced. This suppresses a decrease in the life of the photosensitive drum 54 and the development roller 53.

In response to determining in S04 that the pre-registration sensor 81 has detected the sheet S (S04: YES), that is, when the pre-registration sensor 81 has detected the sheet S before the first time T1 has elapsed from the start of driving of the main motor 91, the controller 9 maintains the transmission state of the drum clutch 96 even after an elapse of the first time T1, and continues the driving of the photosensitive drum 54 and the development roller 53 (S21).

If the pre-registration sensor 81 detects the sheet S before the first time T1 elapses from the start of driving of the main motor 91, it means that there was a residual sheet at a position near the pre-registration sensor 81 (that is, within a particular distance from the pre-registration sensor 81) at the third residual position S3 before the warm-up process is started.

In this case, the controller 9 continues the driving of the photosensitive drum 54 after the first time T1 elapses, conveys the sheet S along the conveyance path P1, and automatically discharges the sheet S (S22). When automatically discharging the sheet S, the controller 9 drives the sheet discharge motor 92 to rotate the sheet discharge roller pair 71, and discharges the sheet S conveyed to the sheet discharge section 7 to the sheet discharge tray 72.

After the automatic sheet discharge is started in S22, the controller 9 determines whether the discharge of the sheet S is completed (S23). The determination as to whether the discharge is completed is performed, for example, by determining whether a particular time has elapsed after the trailing edge of the discharged sheet S passed the sheet discharge sensor 83. The controller 9 repeatedly executes S23 until it is determined that the sheet discharge is completed (S23: NO).

In response to determining in S23 that the sheet discharge is completed (S23: YES), the controller 9 determines whether the warm-up process is completed (S24). The determination as to whether the warm-up process is completed may be performed, for example, by determining whether the second time T2 has elapsed after the main motor 91 started to be driven, as in the case of S07. The controller 9 repeatedly executes S24 until it is determined that the warm-up process is completed (S24: NO).

In response to determining in S24 that the warm-up process is completed (S24: YES), the controller 9 stops driving the main motor 91 (S09), and ends the warm-up process.

If the pre-registration sensor 81 does not detect the sheet S before the first time T1 elapses from the start of driving of the main motor 91, the controller 9 stops driving the photosensitive drum 54 and the development roller 53. If there is a residual sheet near the pre-registration sensor 81 at the third residual position S3, and the pre-registration sensor 81 has detected the sheet S before the first time T1 elapses from the start of driving of the main motor 91, the controller 9 continues the driving of the photosensitive drum 54 and the development roller 53, and executes automatic sheet discharge of the sheet S detected by the pre-registration sensor 81. As a result, the residual sheet is automatically discharged while reducing the driving time of the photosensitive drum 54 and the development roller 53.

Figure 6:
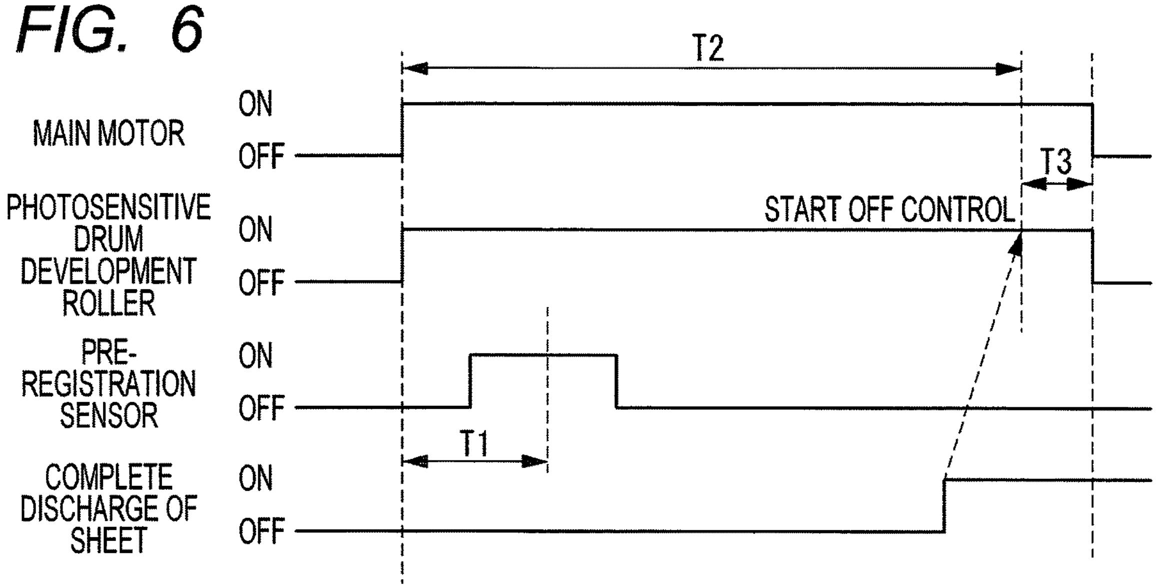
FIG. 6 is a timing chart showing a case where the pre-registration sensor detects a sheet before the first time elapses after the main motor starts driving in the warm-up process.

As shown in FIG. 6, the controller 9 starts the control of stopping the main motor 91 after determining that the sheet discharge is completed. Here, the second time T2 may have already elapsed at the time point when the control of stopping the main motor 91 is started. In this case, the main motor 91 is actually stopped after an elapse of a third time T3 from the start of the control for stopping the main motor 91. Thus, the time required for the warm-up process is equal to or longer than the sum of the second time T2 and the third time T3, which is longer than the second time T2.

In response to determining in S08 that the pre-registration sensor 81 has detected the sheet S (S08: YES), that is, when the pre-registration sensor 81 has detected the sheet S after an elapse of the first time T1 from the start of driving of the main motor 91, the controller 9 determines that the sheet S is jammed (S31).

After determining that the sheet S is jammed, the controller 9 stops the main motor 91 to stop the warm-up process (S32). The controller 9 further outputs a notification prompting the removal of the jammed sheet S (S33). The notification prompting the user to remove the jammed sheet S is performed by displaying the same on a display of the image forming apparatus 1, or by emitting a sound from the image forming apparatus 1, for example.

When the notification prompting the removal of the sheet S is outputted in S33, the image forming apparatus 1 becomes an error state in which a jam has occurred. The user having received the notification prompting the removal of the sheet S removes the sheet S in the image forming apparatus 1, whereby the image forming apparatus 1 returns from the error state. In the image forming apparatus 1, when returning from the error state, the controller 9 performs the warm-up process again.

In this way, if the pre-registration sensor 81 detects the sheet S after the first time T1 elapses from the start of driving of the main motor 91, it means that there was a residual sheet at the fourth residual position S4 or at a position a particular distance away from the pre-registration sensor 81 at the third residual position S3. If there is a residual sheet at the fourth residual position S4 or at the position the particular distance away from the pre-registration sensor 81 at the third residual position S3, the sheet S conveyed along the reconveyance path P2 does not reach the pre-registration sensor 81 before the first time T1 elapses from the start of driving of the main motor 91. Thus, the sheet S is detected by the pre-registration sensor 81 after an elapse of the first time T1 from the start of driving of the main motor 91.

Figure 7:
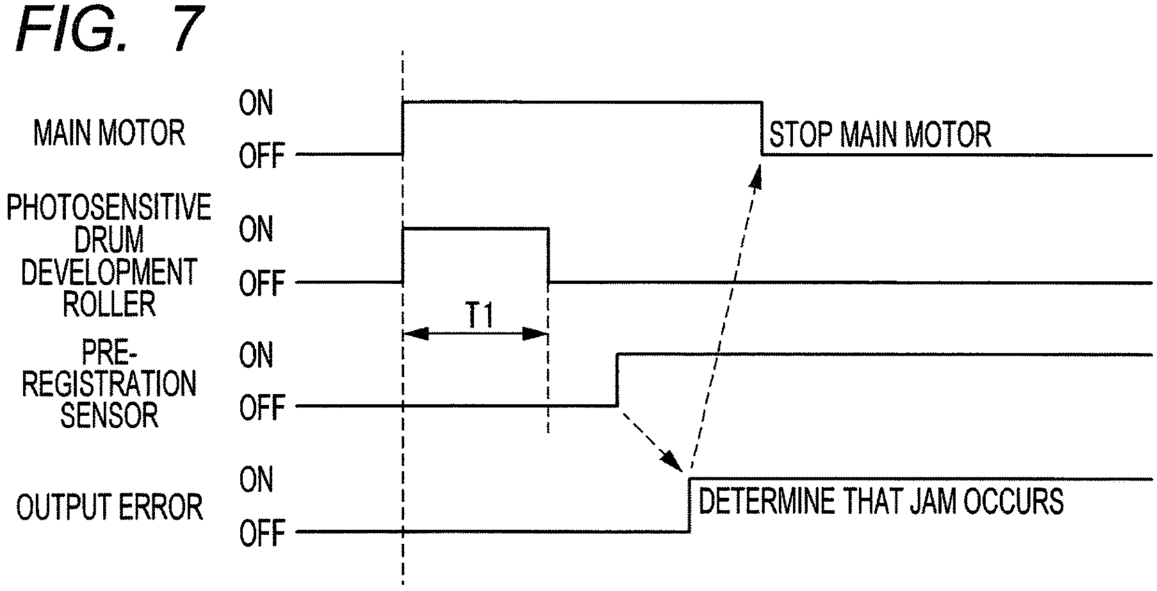
FIG. 7 is a timing chart showing a case where the pre-registration sensor detects a sheet after the first time elapses after the main motor starts driving in the warm-up process.

As shown in FIG. 7, when the pre-registration sensor 81 has detected the sheet S after an elapse of the first time T1 from the start of driving of the main motor 91, the controller 9 determines that a jam occurs (S31), and stops the main motor 91 (S32) to stop the warm-up process. In this way, the warm-up process is stopped when the pre-registration sensor 81 has detected the sheet S after an elapse of the first time T1. Thus, even when the pre-registration sensor 81 has detected the sheet S, the photosensitive drum 54 and the development roller 53 are not driven again, and the driving time of the photosensitive drum 54 and the development roller 53 is reduced. A residual sheet located at the third residual position S3 or the fourth residual position S4 is conveyed along the reconveyance path P2, and a possibility that a jam occurs at these positions is low.

In response to determining in S01 that the pre-registration sensor 81 has detected the sheet S (S01: YES), that is, when the pre-registration sensor 81 has already detected the sheet S before the main motor 91 starts to be driven, the controller 9 determines that the sheet S is jammed (S31).

After determining that the sheet S is jammed, the controller 9 stops the main motor 91 to stop the warm-up process (S32). The controller 9 further outputs a notification prompting the removal of the jammed sheet S (S33).

As described above, if the pre-registration sensor 81 has detected the sheet S before the main motor 91 is driven at the start of the warm-up process, it means that there was a residual sheet at the second residual position S2.

The sheet S located at the second residual position S2 at the start of the warm-up process may be a residual sheet immediately after being fed from the sheet feed mechanism 32 or may be a residual sheet that has been conveyed along the reconveyance path P2. Note that the second residual position S2 in FIG. 3 shows the residual sheet in the latter case. When a residual sheet is automatically discharged, the sheet S will be damaged by the heat of the fuser 60 and so on. However, if the sheet S detected by the pre-registration sensor 81 is the residual sheet immediately after the feeding, by removing the sheet without automatically discharging the sheet, the residual sheet is reused without being damaged by the fuser 60.

In response to determining in S11 that the sheet discharge sensor 83 has detected the sheet S (S11: YES), that is, when the sheet discharge sensor 83 has detected the sheet S after the warm-up process has started, the controller 9 determines that the sheet S is jammed (S41).

After determining that the sheet S is jammed, the controller 9 stops the main motor 91 to stop the warm-up process (S42). The controller 9 further outputs a notification prompting the removal of the jammed sheet S (S43). The notification in S43 may be the same as the notification in S33.

In this way, if the sheet discharge sensor 83 has detected the sheet S after the warm-up process is started, it means that there was a residual sheet at the first residual position S1. For example, if the sheet S detected by the sheet discharge sensor 83 located near the fuser 60 is a jammed sheet and if the sheet is automatically discharged, the sheet S may be wound around the fuser 60 and damage the fuser 60. Thus, if the sheet S remaining at the first residual position S1 is detected by the sheet discharge sensor 83, it is determined that a jam occurs without automatically discharging the sheet to prompt the removal of the sheet S to suppress damage to the fuser 60.

In the image forming apparatus 1, the sheet discharge motor 92 is not driven during execution of the warm-up process, except when the sheet S is automatically discharged in S22. Thus, if a residual sheet is present at the fifth residual position S5 and automatic sheet discharge is not executed, the sheet S located at the fifth residual position S5 will not be discharged during the warm-up process. In this case, the sheet S located at the fifth residual position S5 is discharged in the printing operation after the warm-up process is completed.

Next, the warm-up process when executing the second mode process will be described.

Figure 8:
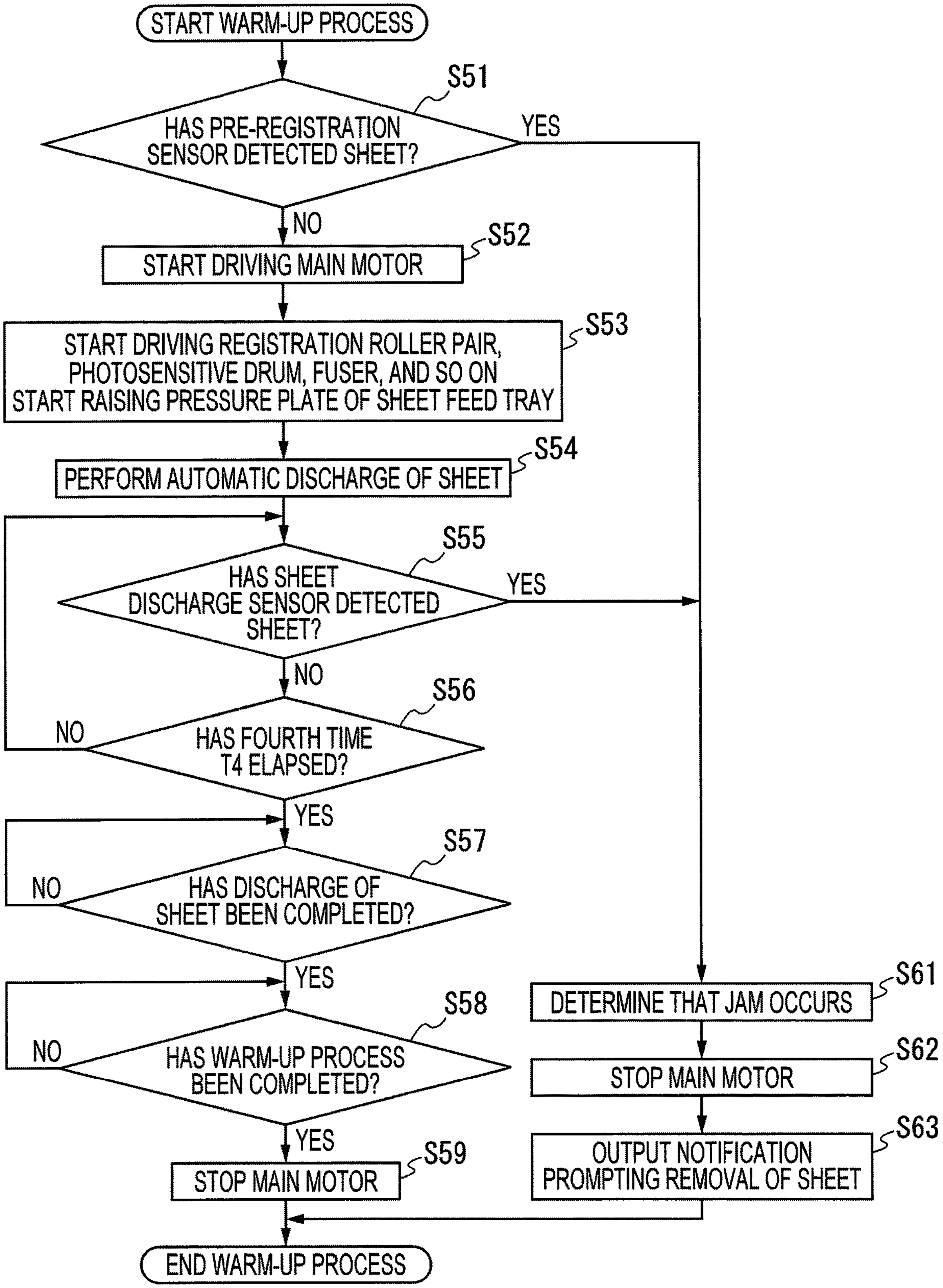
FIG. 8 shows a flowchart of a warm-up process when executing a second mode process.

As shown in FIG. 8, when the warm-up process is started, the controller 9 determines whether the pre-registration sensor 81 has detected the sheet S (S51). In response to determining in S51 that the pre-registration sensor 81 has not detected the sheet S (S51: NO), the controller 9 starts driving the main motor 91 (S52). When the main motor 91 starts to be driven, the controller 9 switches the sheet feed clutch 93, the registration clutch 94, the development clutch 95, and the drum clutch 96 to the transmission state.

When the driving of the main motor 91 is started, the main motor 91 drives the registration roller pair 34, the photosensitive drum 54, the development roller 53, the fuser 60, and so on (S53). The pressing plate 311 of the sheet feed tray 30 is driven by the main motor 91, and the pressure plate 31 starts to rise (S53).

If there is a residual sheet at the third residual position S3 or the fourth residual position S4, the controller 9 starts driving the main motor 91 and then automatically discharges the residual sheet (S54). The controller 9 may detect the presence of a residual sheet at the third residual position S3 or the fourth residual position S4, for example, by determining whether the pre-registration sensor 81 has detected the sheet S within a particular time after the main motor 91 is started to be driven. When automatically discharging the sheet S, the controller 9 drives the sheet discharge motor 92 to rotate the sheet discharge roller pair 71, and discharges the sheet S conveyed to the sheet discharge section 7 to the sheet discharge tray 72.

After the driving of the main motor 91 is started, the controller 9 determines whether the sheet discharge sensor 83 has detected the sheet S (S55). In response to determining in S55 that the sheet discharge sensor 83 has not detected the sheet S (S55: NO), the controller 9 determines whether a fourth time T4 has elapsed after the main motor 91 started to be driven (S56).

In response to determining in S57 that the fourth time T4 has not elapsed (S56: NO), the controller 9 executes S55 again. In response to determining in S55 that the sheet discharge sensor 83 has not detected the sheet S, the controller 9 repeats S55 until the fourth time T4 elapses. For example, the fourth time T4 may be set to the longest time that is required from when the main motor 91 is started to be driven until when a residual sheet reaches the sheet discharge sensor 83 in a case where the residual sheet is present at the first residual position S1.

When the fourth time T4 has elapsed without the sheet discharge sensor 83 detecting the sheet S in S56 (S56: YES), the controller 9 determines whether the discharge of the sheet S by automatic sheet discharge is completed (S57). The determination as to whether the discharge is completed is performed, for example, by determining whether a particular time has elapsed after the trailing edge of the discharged sheet S passed the sheet discharge sensor 83. The controller 9 repeatedly executes S58 until it is determined that the sheet discharge is completed (S57: NO).

In response to determining in S57 that the sheet discharge is completed (S57: YES), the controller 9 determines whether the warm-up process is completed (S58). The determination as to whether the warm-up process is completed may be determined, for example, by determining whether the second time T2 has elapsed after the main motor 91 started to be driven, as in the case of S07. The controller 9 repeatedly executes S58 until it is determined that the warm-up process is completed (S58: NO).

In response to determining in S58 that the warm-up process is completed (S58: YES), the controller 9 stops driving the main motor 91 (S59), and ends the warm-up process. When the warm-up process is completed, that is, when the second time T2 has elapsed after the main motor 91 started to be driven, the raising of the pressure plate 31 of the sheet feed tray 30 is completed.

In the warm-up process when executing the second mode process, the controller 9 constantly drives the photosensitive drum 54 and the development roller 53 from the start to the end of the warm-up process.

In response to determining in S51 that the pre-registration sensor 81 has detected the sheet S (S51: YES), that is, when the pre-registration sensor 81 has already detected the sheet S before the main motor 91 starts to be driven, the controller 9 determines that the sheet S is jammed (S61).

After determining that the sheet S is jammed, the controller 9 stops the main motor 91 to stop the warm-up process (S62). The controller 9 further outputs a notification prompting the removal of the jammed sheet S (S63). The notification in S63 may be the same as the notification performed in S33.

In the warm-up process when executing the second mode process, too, if the pre-registration sensor 81 has detected the sheet S before the main motor 91 is driven at the start of the warm-up process, it means that there was a residual sheet at the second residual position S2.

In response to determining in S55 that the sheet discharge sensor 83 has detected the sheet S (S55: YES), that is, when the sheet discharge sensor 83 has detected the sheet S after the warm-up process has started, the controller 9 determines that the sheet S is jammed (S61).

After determining that the sheet S is jammed, the controller 9 stops the main motor 91 to stop the warm-up process (S62). The controller 9 further outputs a notification prompting the removal of the jammed sheet S (S63).

In the warm-up process when the second mode process is executed, too, if the sheet discharge sensor 83 has detected the sheet S after the warm-up process is started, it means that there was a residual sheet at the first residual position 51.

As described above, in the warm-up process when the second mode process is executed, the photosensitive drum 54 and the development roller 53 are constantly driven while the warm-up process is being performed, and when a residual sheet is present at the third residual position S3 or the fourth residual position S3, the sheet S is automatically discharged.

In the second mode process, since the photosensitive drum 54 and the development roller 53 are always driven while the warm-up process is being performed, the driving time of the photosensitive drum 54 and the development roller 53 is extended compared to the first mode process. However, when there is little need to execute the first mode process, such as when the image forming apparatus 1 is used infrequently, the residual position patterns in which residual sheets are automatically discharged are increased by selecting the second mode and executing the second mode process.

In the image forming apparatus 1, the sheet discharge motor 92 is not driven during the warm-up process, except when the sheet S is automatically discharged in S54. Thus, if the residual sheet is present at the fifth residual position S5 and if the automatic sheet discharge is not executed, the sheet S located at the fifth residual position S5 will not be discharged during the warm-up process. In this case, the sheet S located at the fifth residual position S5 is discharged in the printing operation after the warm-up process is completed.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described invention may be provided as appropriate.

What is claimed is:

1. An image forming apparatus comprising:
- a conveyance roller configured to convey a sheet;
- a photosensitive drum configured to bear a toner image to be transferred to the sheet;
- a fuser configured to fix the transferred toner image to the sheet;
- a sheet discharge tray;
- a sensor located upstream of the conveyance roller in a sheet conveyance direction, the sensor being configured to detect the sheet;
- a switch configured to switch driving and stopping of the photosensitive drum; and
- a controller configured to perform a first mode process as a warm-up process of driving the conveyance roller and the fuser, the first mode process including:
  - driving the photosensitive drum for a particular time;

in response to detecting the sheet within the particular time by the sensor, controlling the switch to continue driving the photosensitive drum after the particular time elapses and to discharge the detected sheet to the sheet discharge tray; and in response to not detecting the sheet within the particular time by the sensor, controlling the switch to stop driving the photosensitive drum at a time point when the particular time elapses, and driving the conveyance roller and the fuser to complete the warm-up process in a state where the photosensitive drum is stopped.

2. The image forming apparatus according to claim 1, wherein the particular time is a time longer than or equal to a time required for the photosensitive drum to rotate three times.

3. The image forming apparatus according to claim 1, wherein the controller is configured to:

in response to determining that the sensor detects the sheet after the particular time elapses in the warm-up process, determine that a jam of the sheet occurs, stop the warm-up process, and output a notification prompting removal of the sheet at which the jam occurs.

4. The image forming apparatus according to claim 1, further comprising a housing in which a conveyance path and a reconveyance path are formed, the conveyance path passing through the conveyance roller, the photosensitive drum, and the fuser, the reconveyance path being formed to guide the sheet having passed the fuser to a merge point where the reconveyance path joins the conveyance path, the merge point being located upstream of the conveyance roller in the sheet conveyance direction, wherein the sensor is located downstream of the merge point in the sheet conveyance direction; and wherein the controller is configured to:

in response to determining that the sensor detects the sheet when starting the warm-up process, determine that a jam of the sheet occurs, stop the warm-up process, and output a notification prompting removal of the sheet at which the jam occurs.

5. The image forming apparatus according to claim 1, further comprising:

a discharge roller located downstream of the fuser in the sheet conveyance direction, the discharge roller being configured to discharge the sheet; and a discharge sensor located between the fuser and the discharge roller, the discharge sensor being configured to detect the sheet, wherein the controller is configured to:

in response to determining that the discharge sensor detects the sheet after starting the warm-up process, determine that a jam of the sheet occurs, stop the warm-up process, and output a notification prompting removal of the sheet at which the jam occurs.

6. The image forming apparatus according to claim 1, wherein the controller is configured to:

perform, as the warm-up process, a second mode process of constantly driving the photosensitive drum during the warm-up process; and selectively set a first mode of performing the first mode process or a second mode of performing the second mode process.

7. The image forming apparatus according to claim 1, further comprising:

a common drive source configured to drive the conveyance roller, the photosensitive drum, and the fuser, wherein the switch is an electromagnetic clutch configured to switch between:

a transmission state in which driving force from the drive source is transmitted to the photosensitive drum; and a cut-off state in which the driving force from the drive source is not transmitted to the photosensitive drum.

8. The image forming apparatus according to claim 1, further comprising:

a housing in which a conveyance path and a reconveyance path are formed, the conveyance path passing through the conveyance roller, the photosensitive drum, and the fuser, the reconveyance path being formed to guide the sheet having passed the fuser to a merge point where the reconveyance path joins the conveyance path, the merge point being located upstream of the conveyance roller in the sheet conveyance direction, the sensor being located downstream of the merge point in the sheet conveyance direction;

a discharge roller located downstream of the fuser in the sheet conveyance direction, the discharge roller being configured to discharge the sheet;

a post-registration sensor located downstream of the conveyance roller in the sheet conveyance direction; and a discharge sensor located between the fuser and the discharge roller, the discharge sensor being configured to detect the sheet, wherein residual position patterns of the sheet in the housing include:

a first residual position that is a residual position where the sheet is located between the post-registration sensor and the discharge sensor;

a second residual position that is a residual position where a leading edge of the sheet is detected by the sensor;

a third residual position that is a residual position where the leading edge of the sheet conveyed along the reconveyance path is located upstream of the sensor in the sheet conveyance direction and a trailing edge of the sheet conveyed along the reconveyance path is located away from the discharge roller;

a fourth residual position that is a residual position where the trailing edge of the sheet conveyed along the reconveyance path is nipped by the discharge roller while the discharge roller is rotating in a reconveyance direction; and a fifth residual position that is a residual position where the sheet is nipped by the discharge roller while the discharge roller is rotating in the reconveyance direction; and wherein, in the first mode process, the controller is configured to:

in response to determining that the sheet is located at the first residual position before the warm-up process is started, determine that a jam of the sheet occurs, stop the warm-up process, and output a notification prompting removal of the sheet at which the jam occurs;

in response to determining that the sheet is located at the second residual position before the warm-up process is started, determine that a jam of the sheet occurs, stop the warm-up process, and output a notification prompting removal of the sheet at which the jam occurs;

in response to determining that the sheet is located at a position within a particular distance from the sensor at the third residual position before the warm-up process is started, continue driving the photosensitive drum after the particular time elapses and discharge the sheet to the sheet discharge tray;

in response to determining that the sheet is located at the fourth residual position or at a position the particular distance away from the sensor at the third residual position before the warm-up process is started, determine that a jam of the sheet occurs, stop the warm-up process, and output a notification prompting removal of the sheet at which the jam occurs; and in response to determining that the sheet is located at the fifth residual position before the warm-up process is started, control the discharge roller to discharge the sheet in a printing operation after the warm-up process is completed.

* * * * *